Sept. 7, 1926.
W. T. SPARROW
1,599,255
FLOOR CLIP DEVICE
Filed June 24, 1925   2 Sheets-Sheet 1
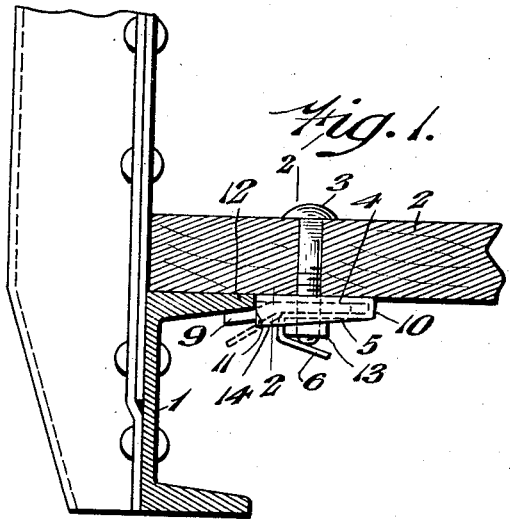
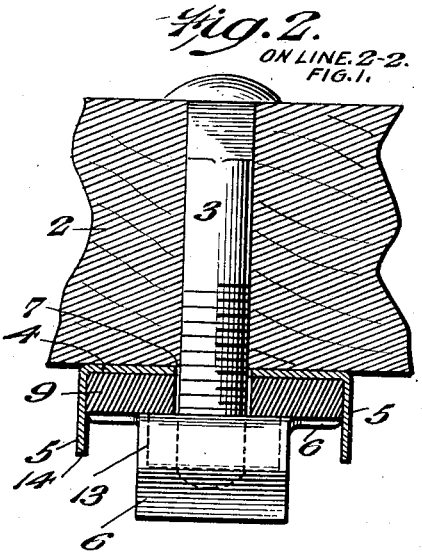
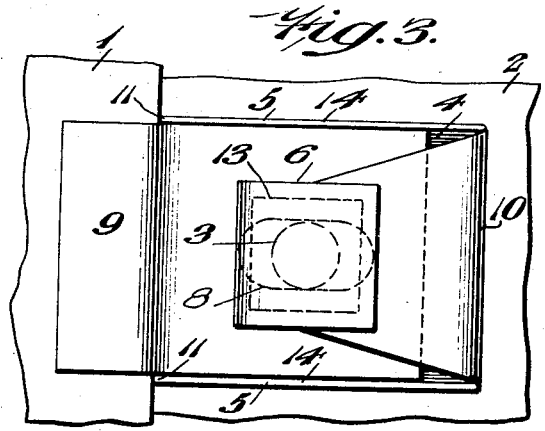
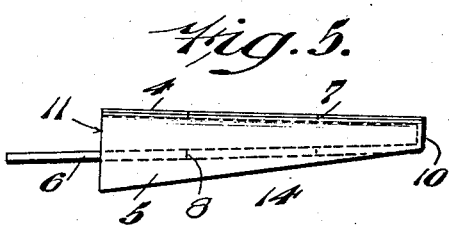
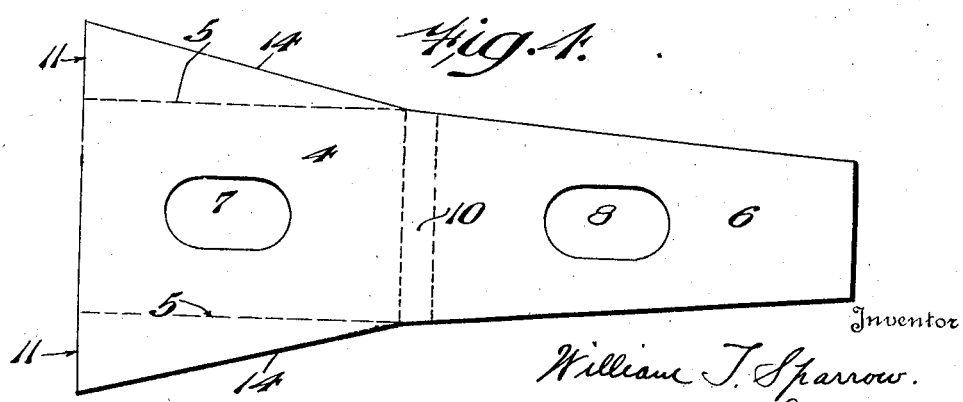
Inventor
William T. Sparrow.
By Wedersheim Fairbanks
Attorneys

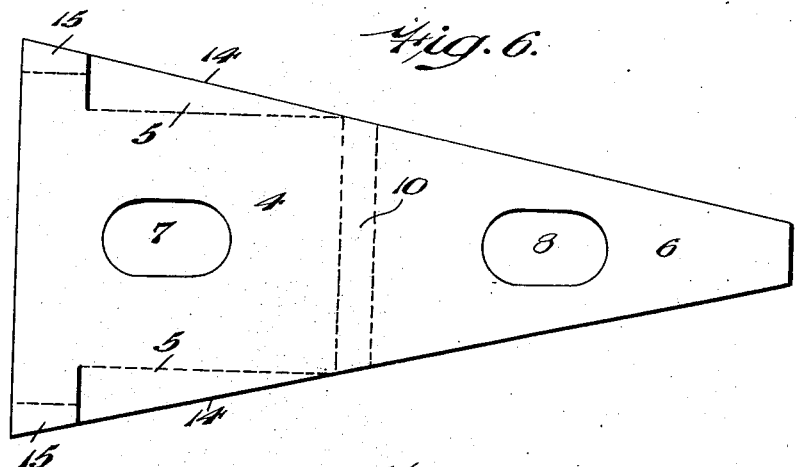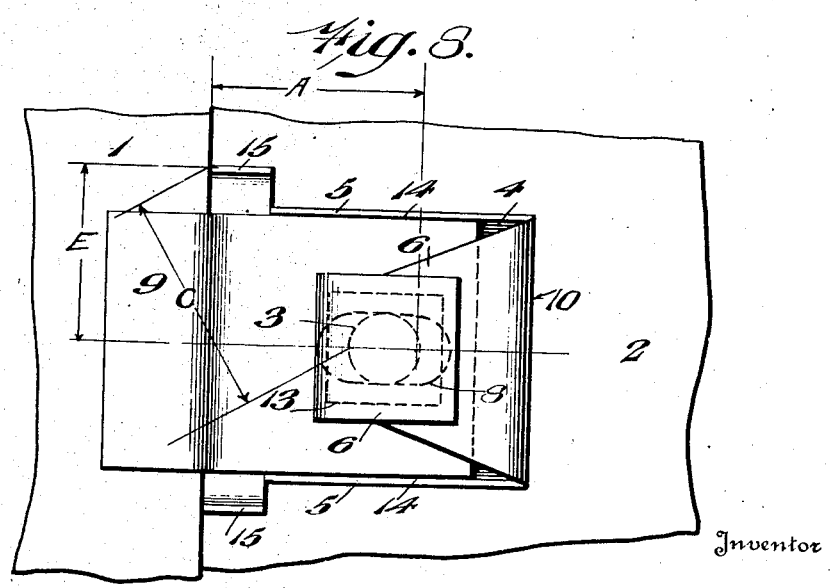

Patented Sept. 7, 1926.

1,599,255

UNITED STATES PATENT OFFICE.

WILLIAM T. SPARROW, OF HAMPTON, VIRGINIA.

FLOOR-CLIP DEVICE.

Application filed June 24, 1925. Serial No. 39,238.

This invention, considered in its broadest aspects, embodies two main objects: to prevent the rotation of floor clips as used for securing the floor boards of a railway car to the underframe, and to prevent the rotation of nuts on bolts used for securing these clips to the floor boards, my novel lock being also adapted for use wherever the clip method of fastening is employed to secure one part of a structure to another.

The leading objects of my present invention, as stated, reside in the provision of a device for preventing the rotation of fastening clips and nuts in which a substantially boxlike structure, adapted to the size of the clip, is provided, the upper surface and side walls of which device are squared to about against an under-frame member employed for supporting floor boards, there being apertures in the upper and lower surfaces of the device for bolt reception and in which the lower part of the device may be bent downwardly to engage one side of the nut on the bolt and so serve to prevent displacement of device and rotation of the nut.

Other and further objects of the present invention reside in the provision of novel features of construction, arrangement and combination of parts for attaining the results sought by said leading object. Still other and further objects of the invention not at this time more especially pointed out will be hereinafter referred to.

The invention further consists in other novel features of construction and advantage as will be hereinafter described and finally pointed out in the claims appended hereto.

The nature, characteristic features and scope of the invention will be more fully understood from the following description taken in connection with the accompanying drawings forming part hereof, and in which:—

Fig. 1 is a fragmentary view in section of a car floor provided with a clip and nut lock embodying my invention.

Fig. 2 is a vertical sectional view on line 2—2 of Fig. 1.

Fig. 3 is a plan view of the underside of Fig. 1.

Fig. 4 is a plan view of a blank used for forming my novel locking device.

Fig. 5 is a view of the device in elevation ready for application to the work to be held.

Fig. 6 is a plan view of a blank illustrating a slightly modified form of clip and nut locking device.

Fig. 7 is a side elevation of the completed modified device ready for application to work to be done; and Fig. 8 is a bottom plan view illustrating the application of said modified form of device.

For the purpose of illustrating my invention I have shown in the accompanying drawings two forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in detail, 1 designates a support, as for instance, the underframe of a car, and 2 designates a plurality of floor boards arranged in superimposed relation as supported upon the frame 1. The floor boards are apertured for the passage therethrough of a bolt 3. According to the present invention I next position the clip and nut locking device embodying my invention, which comprises a substantially box-like structure formed from a single piece of metal and comprising an upper plate 4, vertical side walls 5, and a lower lip 6. The upper plate 4 is apertured at 7 and the lip 6 is apertured at 8 for penetration therethrough of the threaded end of the bolt 3. With the clip and nut locking device positioned against the underside of the boards 2 a conventional clip 9 is positioned with respect to the clip and nut locking device so that one end thereof engages beneath the frame 1 and the apertured end thereof is positioned so that its aperture is in register with the openings 7—8 in the clip and nut locking device. So positioned, the closed end 10 of the clip and nut locking device is spaced from the end of the clip 9 in order to take care of variation in bolt hole location. The ends 11 of the side walls of the clip and nut locking device abut against the inner end 12 of frame 1, as clearly shown in Fig. 1, which also shows a nut 13 on the threaded end of bolt 3 to securely interlock the bolt, boards, clip and locking device with respect to frame 1. The free end of the lip 6 is then bent downwardly to closely hug the nut and the terminal of the lip is finally bent inwardly to abut against the lower end of the bolt and nut. The apertures 7 and 8 of the clip and nut locking device are elongated, as clearly shown in Fig. 4, to take care of variation usually to be expected in bolt hole location in the floor boards. As clearly shown in Fig. 4, the lip 6 is tapered, and as shown in Fig. 5, the bottom edges of the side walls are inclined as at 14. From the above description, it is apparent that since the ends 11 of the vertical walls 5 of the device abut against frame 1, it is impossible for the clip and nut locking device to move about its vertical axis and that it is impossible for the nut of the bolt to turn, because it is held by the turned over part of lip 6. The side walls also prevent clip movement. Referring to Figs. 6, 7, and 8, there is disclosed therein a modified form of clip and nut locking device, which is very similar to the hereinbefore described clip and nut locking device with the exception that the free ends of the side walls are provided with extensions which in practice are bent laterally and downwardly to form ears 15 whereby better contacting surfaces may be obtained between the ends of the clip and nut locking device and the end of frame 1 thus reducing to a minimum the possibility of movement of the clip and nut locking device about its vertical axis. It is evident from an inspection of Fig. 8 that dimension C can be controlled by varying dimension E which therefore makes it possible to keep dimension C greater than dimension A for any clip width and bolt location thus preventing rotation of the clip and lock.

It will now be apparent that I have devised a novel and useful construction which embodies the features of advantage enumerated as desirable in the statement of the invention and the above description and while I have in the present instance shown and described the preferred embodiments thereof which have been found in practice to give satisfactory and reliable results it is to be understood that the same are susceptible of modification in various particulars without departing from the spirit or scope of the invention or sacrificing any of its advantages.

Having thus described my invention, what I claim as new and desire to secure by Letters Patent, is:—

1. A device of the character stated comprising a relatively box-like member of integral structure having a flat horizontal top apertured to receive a bolt, parallel vertical side walls and a horizontal lip also apertured to receive a bolt, the free end of which lip is adapted to be bent downwardly and under a nut for bolt end engagement.

2. A device of the character stated comprising a relatively box-like member of integral structure having a flat horizontal top apertured to receive a bolt, parallel vertical side walls and a horizontal lip also apertured to receive a bolt, the free end of which is adapted to be bent downwardly and under a nut for bolt end engagement, said apertures being elongated.

3. A device of the character stated comprising a relatively box-like member of integral structure having a flat horizontal top apertured to receive a bolt, parallel vertical side walls having inclined lower edges and wall engaging ends and a tapered horizontal lip also apertured to receive a bolt, the free end of which lip is adapted to be bent downwardly and under a nut for bolt end engagement.

4. A device of the character stated comprising a relatively box-like member of integral structure having a flat top apertured to receive a bolt, the top of said member being provided with opposed extension flanges, parallel side walls arranged in advance of said flanges, and a lip also apertured to receive a bolt, the free end of which lip is adapted to be bent downwardly about a nut for bolt end engagement.

5. A device of the character stated comprising a relatively box-like member of integral structure having a flat top apertured to receive a bolt, the top of said member being provided with opposed extension flanges, parallel side walls arranged in advance of said flanges, said extension flanges being extended laterally beyond said side walls and then downwardly in parallelism therewith, and a lip also apertured to receive a bolt, the free end of which lip is adapted to be bent downwardly about a nut for bolt end engagement.

In testimony whereof, I have hereunto signed my name.

WILLIAM T. SPARROW.